United States Patent [19]

Pritchett

[11] 4,243,769

[45] Jan. 6, 1981

[54] COMPATIBILIZATION OF BLENDS AND COMPOSITES

[75] Inventor: Ervin G. Pritchett, Cincinnati, Ohio

[73] Assignee: National Distillers and Chemical Corp., New York, N.Y.

[21] Appl. No.: 839,234

[22] Filed: Oct. 4, 1977

Related U.S. Application Data

[63] Continuation-in-part of Ser. No. 600,332, Jul. 30, 1975, abandoned.

[51] Int. Cl.$^3$ .................. C08L 23/00; C08L 27/00
[52] U.S. Cl. ..................... 525/222; 260/17 R; 525/192; 525/56; 525/194; 525/57; 525/205; 525/61; 525/209; 525/72; 525/221; 525/78; 525/230; 525/79; 525/232; 525/80; 525/233; 525/175; 525/234; 525/178; 525/238

[58] Field of Search .............. 260/893, 897 B, 898, 260/16, 29.6 SQ, 17 R, 857, 873, 876, 887, 898; 264/182, 171; 525/72, 78, 79, 80, 175, 178, 192, 194, 205, 209, 221, 222, 230, 232, 233, 234, 238, 61, 57, 17 Q, 16

[56] References Cited

U.S. PATENT DOCUMENTS

| | | | |
|---|---|---|---|
| 3,336,149 | 8/1967 | Fox et al. | 260/29.6 SQ |
| 3,437,718 | 4/1969 | Rees | 260/897 B |

FOREIGN PATENT DOCUMENTS

| | | | |
|---|---|---|---|
| 40-8837 | 5/1965 | Japan | 260/897 B |
| 760179 | 10/1956 | United Kingdom | 264/182 |

*Primary Examiner*—J. Ziegler
*Attorney, Agent, or Firm*—Kenneth D. Tremain

[57] ABSTRACT

Compatibilized blends and composites of materials containing nitrile functionality with materials normally incompatible therewith are formed by mixing the components in the presence of an acid compatibilizing agent.

20 Claims, No Drawings

COMPATIBILIZATION OF BLENDS AND COMPOSITES

This is a continuation-in-part of U.S. Ser. No. 600,332 filed July 30, 1975 now abandoned.

BACKGROUND OF THE INVENTION

Of the enormous quantity of synthetic polymer compositions produced, about eighty percent are based on a very few monomers. Variety in properties of these polymer compositions has been obtained through differing combinations of the monomers in simple copolymers, block and graft copolymers and in a myriad of polyblends and of composites with various fillers. Often complex and costly processes are devised to modify and improve the properties of useful compositions. For example, styrene-acrylonitrile copolymer (SAN) has desirable properties of moldability and solvent resistance but has very poor impact resistance. Acrylonitrile-butadiene-styrene terpolymers (ABS) were developed, therefore, to furnish impact resistant compositions. The ABS terpolymers of value generally are produced by forming SAN in the presence of preformed polybutadiene (PBD) to yield a graft terpolymer composition in processes much more complex than is simple terpolymerization. Even the ABS compositions have deficiencies, however, a major one being poor resistance to weathering attributable to the PBD.

Much effort has been expended to find a suitable substitute for the PBD portion of ABS. Among other candidates, rubbery ethylene-vinyl acetate (EVA) has been suggested, e.g., by Bartl and Hardt, Adv. Chem. Ser. No. 91, 477 (1969). However, SAN does not suitably graft to EVA, and only recently have desirable SAN-EVA graft compositions been prepared by the device of pre-exchanging some of the EVA acetate groups for methacrylate groups to introduce graftable unsaturation therein (Ohshima et al., Japan Pat. No. 73-01,715), or by coreacting some 5–40% of a monoolefin in a modified grafting operation as is disclosed in Alberts et al., U.S. Pat. No. 3,855,353. Such devious methods are commercially unattractive, and technology continually seeks simple and rapid methods to combine readily available compositions into more desirable ones.

When a combination of components which normally are incompatible is desired, it is now known to achieve compatibilization by adding a preformed graft copolymer in which segments represent each of the incompatible components as in Gaylord, U.S. Pat. No. 3,485,777 or to react a mixture of such materials with a coupling agent (e.g., combination of an unsaturated carboxylic anhydride and a free radical initiator) to induce in situ grafting as in Gaylord, U.S. Pat. No. 3,645,939. However, even these latter processes have disadvantages; e.g., the process of the former Gaylord patent requires special graft copolymer additives, while that of the latter requires a volatile coupling agent which offers very low efficiency in practice.

Accordingly, it is an object of this invention to provide a simple, rapid and efficient method to produce novel and useful polyblends and composites. Another object of this invention is to compatibilize normally incompatible blends and composites by inducing chemical condensation reactions between functional groups innate to the components thereof.

It is a more specific objects of this invention to compatibilize normally incompatible blends and composites of at least one nitrile group containing component with at least one other component normally incompatible therewith, but containing functional groups chemically condensable with nitrile groups, by bringing the components together in the presence of a minor amount of acid compatibilization agent. A quite specific object of this invention is to provide novel impact and age resistant polyblends of EVA in SAN through a simple, rapid and efficient process.

These and other objects of the invention will become apparent to those skilled in the art from the following detailed description.

SUMMARY OF THE INVENTION

This invention relates to compatibilized blends and composites of materials containing nitrile group functionality with materials normally incompatible therewith, but which contain functional groups chemically condensable with nitrile functionality, and to a process for the preparation of such compatibilized blends and composites. More particularly, this invention relates to the compatibilization of normally incompatible blends and composites of a nitrile group containing component with at least one other component containing functional groups chemically condensable with nitrile groups by bringing the components together in the presence of a minor amount of an acid compatibilization agent and to the novel and useful compositions provided thereby.

DESCRIPTION OF THE PREFERRED EMBODIMENTS

The objects of this invention are attained by mixing nitrile group containing and nitrile condensable functional group containing components together with a minor amount of an acid. Preferably, at least one of the components is a thermoplastic or liquid polymer to allow intimate mixing without the aid of a solvent. Also, preferably, the components are melt blended together with the acid in a suitable mill or extruder. For example, the component, functionally reactive materials are intimately mixed, the acid is injected and mixing is continued until reaction is complete. Alternatively, the acid may be pre-mixed with one of the component materials and other components then added to this pre-mix, mixing of the whole being continued until the desired reaction is realized. Those familiar with the art will discern various ways in which the materials involved may be brought together to accomplish the purpose of this invention, and the process of this invention is not to be limited to any particular mode of combination of materials. However, it is preferred for simplicity to inject an aqueous solution of the acid in amount just sufficient to induce the desired compatibilization into a melt blend of the component materials and to shear blend the mixture until suitable compatibilization is complete. As used herein, the term "compatibilization" means the conversion of a mixture of at least two components into a grossly homogeneous, permanently miscible composition which has useful properties not evident in a simple blend of the components, and which does not separate spontaneously into its component parts.

It is believed that the compatibilizations realized in the practice of this invention result from a type of cross-linking between the components as a result of intercondensation reactions involving nitrile groups and functionality condensable therewith, the acid acting as a condensation agent. Such condensation reactions are known in simple monomolecular chemistry. It is surprising, however, that polymer reactions of such nature are possible at rapid rates, and yield novel and useful compositions without an extreme loss of thermoplasticity through cross-linking. It is also surprising on the basis of prior chemical art that acids having pKa values of more than about 1 may serve as condensation agents for components containing nitrile functionality with those containing alcohol functionality. In addition to and despite the chemistry suggested above, it is to be noted that other, obscure factors are involved in the process of the present invention. For example, oxygen is found to be beneficial to rapid reaction rates, a factor not clearly applicable to acid induced condensation. Similarly, melt viscosity increase versus time plots for the alloying of certain thermoplastics via the process of this invention are non-linear suggesting phase changes occur which are not predictable on the basis of the chemistry thought to be involved.

In the practice of this invention, the nitrile group containing component may be any material of limited volatility at 100°–250° C. and having nitrile functionality. By limited volatility is meant a loss of not exceeding 20% per hour of a volatile component under compatibilization conditions. Of particular utility are polymers and copolymers of nitrolic monomers such as acrylonitrile, methacrylonitrile, cyanostyrene, cyanobutadiene, methyl cyanoacrylate, methylene glutaronitrile, fumaronitrile, cinnamonitrile and the like. The monomers generally contain 1 to about 2 nitrile groups. Their polymers and copolymers including polyacrylonitrile, polymethacrylonitrile, methacrylonitrile-acrylonitrile-vinyl acetate terpolymers, styrene-acrylonitrile copolymers, acrylonitrile-acrylic ester copolymers, acrylonitrile-styrene-alpha methyl styrene terpolymers, nitrile rubber, polycaprolactam (graft-acrylonitrile), polyethylene (graft-acrylonitrile), polyethylene terephthalate (graft-acrylonitrile), p-cyanostyrene-methyl methacrylate copolymer, acrylonitrile-methyl vinyl ether copolymer, ABS, methacrylonitrile-alpha methyl styrene copolymer and the like. In addition, other materials such as cyanoethylated polymers may be used as the nitrile containing component, for example, cyanoethylated cellulose materials, polyvinyl alcohols, polyamides, polystyrene (e.g., according to U.S. Pat. No. 2,941,990), silicone polymers and the like. Where a cyanoethylated polyalcohol, such as cyanolated cotton, is used, it is preferred that this material be highly cyanoethylated for the purposes of this invention; that is, more than about 85% of the hydroxyl function should be cyanoethylated. However, high degrees of cyanoethylation are not imperative, particularly where the hydroxyl function is protected by other groups such as in partly saponified polyvinyl acetate or vinyl acetate copolymer.

Nitriles having a multiplicity of cyano groups per molecule and with molecular weights in the range of about 1,000 to about 1,000,000, particularly thermoplastic nitrile functional polymers with molecular weights at least about 10,000, are preferred in the practice of this invention; however, simple nitriles having molecular weights down to about 100 may be included in minor quantities of less than about 20%, preferably less than about 10% of the final composition. For example, aliphatic or alicyclic nitriles having more than about 5 carbon atoms such as lauronitrile, stearonitrile, cinnamonitrile, adiponitrile, tricyanoethoxy propane, methylene glutaronitrile, diethylallyl acetonitrile, phenyl crotononitrile, hexakis-(2-cyanoethoxy)-cyclohexane and the like or aromatic nitriles such as 2-napthonitrile, cyanostyrene, 4-cyanophenol, 1,4-dicyanobenzene and the like may be incorporated in minor quantities.

The component materials containing at least one functional group chemically condensable with nitrile functionality are alcohols and esters thereof of limited volatility at 100°–250° C. such as polymers and copolymers of vinyl alcohol or of its ester such as with formic, acetic, propionic, cyclohexanecarboxylic, benzoic, cinnamic, and linoleic acids and the like. Typical examples include polyvinyl alcohol, polyvinyl butyral containing unreacted alcohol groups, ethylene-vinyl acetate copolymer, saponified or partly saponified ethylene-vinyl acetate copolymers, ethylene-vinyl acetate-sulfur dioxide terpolymer, vinyl chloride-vinyl acetate copolymer, nylon grafted with vinyl acetate, polytetrafluoroethylene grafted with vinyl acetate, polyvinyl alcohol grafted with butyl methacrylate, vinyl acetate-isobutyl vinyl ether copolymer, styrene-allyl alcohol copolymer, and the like. Further examples of suitable component materials having groups condensable with nitrile functionality are polyesters such as polyethylene adipate, styrenated polyester of mixed maleic and phthalic acids with ethylene and propylene glycols, polyethylene terephthalate and the like; cellulosic materials such as starch, wood powder, cotton fiber, cellulose acetate, methyl or ethyl cellulose, cellulose acetate grafted with polystyrene and the like; copolymers of hydroxylated monomers such as 2-hydroxyethyl methacrylate, hydroxy butyl vinyl ether, 2-hydroxyethyl methacrylamide and the like; and various miscellaneous functional polymer alcohols such as polyethylene glycol, hydroxyl terminated polymers of such monomers as styrene, butadiene, isoprene and the like as well as their esters. The materials can have any number of alcohol or ester functionalities, e.g., 1–10,000 or more per molecule, although materials having more than one alcohol or ester functionality per molecule are preferred.

While alcohols and esters thereof having a multiplicity of these functional groups and with molecular weights in the range of about 1,000 to about 1,000,000, particularly thermoplastic polymers with multiple alcohol or esterified alcohol groups and molecular weights above about 10,000 are preferred in the practice of this invention, simple alcohols and their esters or partial esters having molecular weights down to about 100 may be included in minor quantities of less than about 20%, preferably less than about 10% of the final composition. For example, aliphatic or alicyclic alcohols and their esters such as glycerol, distearin, tripalmitin, octadecanol, dodecanediol, norborneol, cryptol, pentaerythritol, cellobiose octaacetate and the like and their aromatic substitution derivatives such as cinnamyl alcohol, 2-phenyl-1-cyclohexanol, 2,2-diphenylethyl acetate, 1,3-diphenyl-1,3-propanediol and the like may be incorporated in minor quantities.

One or more nitrile components can be compatibilized with one or more components normally incompatible therewith. Also, if desired, one or more of the components can be used in the form of a solution thereof in an inert solvent.

The type of acid compatibilizing agent employed depends on the type of materials containing functional groups chemically condensable with nitrile functionality employed. When this second component is an alcohol, either strong or weak acids may be employed. When the second component is an ester without free hydroxyl groups, a strong acid compatibilizing agent is necessarily employed.

The acid compatibilization agent is a proton donor acid having pKa in water less than about 4 and preferably less than about 3. Examples include aryl sulfonic acids such as benzene sulfonic acid, toluene sulfonic acids, naphthalene sulfonic acid, 2,7-naphthalene disulfonic acid, dodecyl benzene sulfonic acid and the like; alkyl esters of sulfuric acid such as lauryl sulfuric acid and the like; carboxylic acids such as oxalic, trichloracetic, 2-methyl-6-nitrobenzoic and the like; other organic such as picric acid, citric acid, salicylic acid, d-tartaric acid, mandelic acid, and the like; as well as inorganic acids, e.g., mineral acids, such as perchloric, sulfuric, hydrochloric, phosphorous, bisulfate ion acids (e.g., $KHSO_4$) and the like. If the acid to be employed has more than one dissociable hydrogen, the acid is included in the context of this invention if the pKa in water for at least one of the hydrogens is less than about 4. It is preferred that the acid component be relatively stable and reasonably non-volatile at about 150°–220° C. to reduce losses during processing. Weak acids having pKa between about 3 and about 1 are preferred if it is desirable to avoid hydrolysis of ester groups during the compatibilization process of this invention, for example, in the compatibilization of styrene-acrylonitrile-methyl methacrylate terpolymer with partly saponified ethylene-vinyl acetate copolymer. Strong acids having pKa of less than about 1 are required if the component to be compatibilized with the nitrile group containing component has only esterified hydroxyl functionality; e.g., as in ethylene-vinyl acetate copolymer.

A weak acid compatibilizing agent is a proton donor acid having a pKa in water (of one or more dissociable hydrogens) greater than about 1 and less than about 4. Preferably, the pKa is about 1 to 3. Typical examples include maleic, sulfamic, citric, nitrobenzoic, chloracetic and like acids. A strong acid compatibilizing agent is a proton donor acid having pKa in water less than about 1; typical examples include sulfuric, aryl sulfonic, picric and perchloric acids.

In the practice of this invention, it is preferred, but not essential, that both the nitrile containing component and the component containing groups condensable with nitrile be thermoplastic in the temperature range of about 100° to 300° C. If desired, one of the components may be a finely divided solid having a particle size less than about 10 microns, and preferably less than about 1 micron. For example, finely powdered polyacrylonitrile may be the nitrile containing component or finely powdered starch may be the other component. It is necessary, however, that both components not be solids infusible at about 100°–300° C. Furthermore, one or both of the components may be liquid at about 100°–300° C., for example, a liquid ethylene-vinyl acetate copolymer may be used.

The ratios of the major components of the compositions of this invention may vary widely from about 5% to about 95% of the nitrile containing component, and from about 95% to about 5% of the component containing groups condensable with nitrile. For example, compositions of from about 50% to about 95% SAN, preferably 75%–85%, compatibilized with from about 50% to about 5% EVA, preferably 35%–15%, are useful as "high impact" SAN compositions, while those with about 50% to about 95% rubbery EVA compatibilized with about 50% to about 5% polymethacrylonitrile are useful as nitrile modified EVA rubbers.

The acid compatibilization agent of this invention comprises only about 0.001% to about 8% of the total composition, preferably about 0.1% to about 5%. It is important in this respect to avoid the presence of bases such as basic nitrogen containing monomer (for example, vinyl pyridine modifier for polyacrylonitrile) except in small quantities which may be readily neutralized by the addition of excess acid compatibilization agent. Subject to this proviso, conventional additives such as pigments, fillers, plasticizers, stabilizers, lubricants, etc., can be incorporated at any time during the compatibilization process.

The process of this invention is effected at a temperature sufficient to allow ready mixing of the components, but not so high as to result in excessive decomposition or degradation; that is, generally in the temperature range of about 100° to about 300° C., preferably about 100° to about 225° C. Mixing of the components is continued until compatibilization has been realized. Usually the mixing time ranges from about 2 to 60 minutes, preferably about 10 to 40 minutes, although longer or shorter times can be used if desired. The pressure employed is not critical and is preferably ambient. It is usually convenient to effect mixing under an inert atmosphere such as nitrogen, argon, and the like, to avoid extraneous influences on the process (e.g., oxygen leads to variable reaction rates); but the inert atmosphere is not essential, particularly when suitable antioxidants are added.

The following Examples are intended to illustrate more clearly the nature of the present invention without limiting its scope. Throughout this specification and claims, all parts and percentages are by weight and all temperatures are in degrees centigrade unless otherwise specified. Impact test moldings are conditioned according to Procedure A of ASTM D618.

EXAMPLE 1

To the roller blade equipped mixing chamber of a C. W. Brabender Plastograph preheated to 170° C. and nitrogen blanketed are added 32 parts of SAN and 8 parts of an EVA having 42% vinyl acetate content. The SAN is Dow TRYIL-767 general purpose styreneacrylonitrile copolymer having about 28% acrylonitrile content. The EVA is an ethylene-vinyl acetate copolymer prepared by the known high pressure copolymerization process. The mixture is masticated at 60 rpm and, after 2 minutes mixing and at a temperature now of 175° C., 0.31 part of p-toluene-sulfonic acid as a 1.5 molar solution in water is injected over one minute. The viscosity of the masticating mass soon begins to increase as measured by torque at 60 rpm, continuing for about 30 minutes at up to 192° C. to a value about 1.4 times the original indicating cross-linking. One part of water is injected, milling is continued for 5 minutes and the finished composition is removed and cooled.

EXAMPLE 2

Example 1 is repeated except that there is no addition of p-toluenesulfonic acid, an equal volume of distilled water being injected instead. No torque increase is observed.

The products of Examples 1 and 2, and also the SAN alone, are compression molded into 1¾" dia. by ⅛" thick discs which are tested for impact resistance at 25° C. using a Gardner 1120-M Variable Height Impact Tester.

| Composition | Gardner Impact In.Lb./Mil |
|---|---|
| Example 1 | 1.4 |
| Example 2 | 0.02 |
| SAN only | <0.02 |

It is apparent that the combination of EVA modification and added p-toluenesulfonic acid resulted in a very substantial impact strength for the composition of Example 1.

EXAMPLES 3-7

Example 1 is repeated several times with varying ratios of EVA to SAN components according to the following tabulation which also records impact resistance values for the several compositions:

| Example | Parts EVA Per 100 Parts Total | Parts Acid Per 100 Parts Total | Gardner Impact In.Lb./Mil |
|---|---|---|---|
| 3 | 0 | 0.77 | <0.02 |
| 4 | 5 | 0.82 | 0.1 |
| 5 | 15 | 0.88 | 0.3 |
| 6 | 30 | 0.81 | 1.9 |
| 7 | 50 | 0.77 | 1.0 |

EXAMPLES 8-10

1.5 molar ammonium bisulfate, a solution 1.5 N in acid sulfate, is prepared by adding 154.6 parts of 96% sulfuric acid to ice and further adding 92.7 parts of 28% ammonia and sufficient water to adjust the solution volume to furnish the 1.5 molar concentration.

A 20% saponified EVA is prepared from the EVA of Example 1 according to the process disclosed in Belgian Pat. No. 804,404, and contains 35% unchanged vinyl acetate together with, therefore, 4.5% hydroxyl and 60.5% ethylene.

In the following, the directions of Experiment 1 are followed using 32 parts of the SAN together with the materials indicated.

In Example 8, the 20% hydrolyzed EVA above described is substituted for the EVA of Example 1 in equal parts and 0.207 part of ammonium bisulfate as the 1.5 molar solution above described is substituted for the p-toluene sulfonic acid. Following the bisulfate solution addition, a torque change is evident which amounts to a 1.3-fold increase after 28 minutes total milling time. The product is removed and cooled after a total of 35 minutes mixing.

In Example 9, Example 8 is repeated except that 0.345 rather than 0.207 part of ammonium bisulfate is added. A 1.36-fold torque increase is evident over 25 minutes.

In Example 10, Example 1 is repeated using the original unsaponified EVA but substituting 0.207 part of ammonium bisulfate for the 0.31 part of p-toluenesulfonic acid. Only a very slight torque increase is observed. The product is removed and cooled after 35 minutes milling.

The product of Example 10 is brittle in bending; that of Example 8 is not brittle in bending, but has low tear resistance in thin section; while the product of Example 9 is not brittle in bending and has good tear resistance. The products are compared in the Gardner impact resistance test with the results summarized below:

| Example | Gardner Impact In.Lb./Mil |
|---|---|
| 8 | 0.4 |
| 9 | 1.6 |
| 10 | 0.05 |

EXAMPLES 11-14

In these Examples, EVA copolymers having varying vinyl acetate contents are substituted in the process of Example 1 for the 42% vinyl acetate copolymer used therein. The finished compositions, all at a ratio of 20 parts EVA to 80 parts SAN and with 0.77 parts of p-toluenesulfonic acid per 100 parts of resin mixture are compared in gardner impact resistance.

| Example | % Vinyl Acetate in EVA | Gardner Impact In.Lb./Mil |
|---|---|---|
| 11 | 17 | 0.02 |
| 12 | 28 | 0.2 |
| 13 | 54 | 0.55 |
| 14 | 70 | 0.1 |

EXAMPLE 15

Polymethacrylonitrile is prepared in emulsion polymerization using 230 parts water, 3 parts sodium lauryl sulfate, 1.2 parts n-dodecyl mercaptan, 0.5 part ammonium persulfate and 98 parts methacrylonitrile monomer. After polymerization for 7 hours at 50°-70° C., the latex is coagulated in methanol, the solids filtered out and the product washed with methanol and dried. The polymethacrylonitrile product is readily compression moldable at 150° C.

Into the Plastograph mill of Example 1, preheated to 150° C., is placed a mixture of 6 parts of the above described polymethacrylonitrile and 34 parts of the EVA of Example 1, milling being at 60 rpm and 150° C. chamber temperature. At 2 to 3 minutes milling time, there is added 1.5 molar p-toluenesulfonic acid equivalent to 0.77 part of acid. The torque initially decreases, then increases 1.3-fold over the period 6.5 to 30 minutes. After the addition of 1 part of water, milling is continued to 40 minutes total. The product, removed and cooled, is a translucent rubber having properties of very good tensile strength, superior elongation and good return.

EXAMPLE 16

In the Plastograph mixing chamber of Example 1, preheated to 170° C., are mixed 18 g SAN resin and 12 g of ARGO brand (Best Foods Division of Corn Products Company) starch and milled at 40 rpm under a nitrogen atmosphere. The blend viscosity decreases initially, leveling out at a torque reading of about 7000 M.G. at 186° C. over 15-40 minutes milling time. The blended product is translucent with white specks very evident and quite brittle.

The above procedure then is repeated except that 0.345 part of ammonium bisulfate as a 1.5 molar solution is added at 5 minutes milling time. Torque decreases to a minimum of 5800 M.G. at 178° C. and 10 minutes, then increases to 10,500 M.G. at 195° C. and 25-30 minutes milling time, at which point the mill is stopped. The product is darkly opaque and brittle with a shiny surface on molding at 160° C., but evidences no visible heterogeneous specks. The torque rise observed is 1.8-fold compared to none where no acid was added.

EXAMPLE 17

A 10.7 g sample of the compatibilized polyblend product of Example 1 is extracted exhaustively with refluxing acetone which is a solvent for SAN resin. The acetone insoluble residue (23.3%) then is exhaustively extracted with toluene, a solvent for the EVA component, at room temperature. The residue (19%), insoluble both in acetone and in toluene, pressed into a suitably thin film, is compared by infra-red spectra with thin films of SAN and of EVA. Absorption characteristic both of SAN (at about 3600–3550, 2250, 1590–1570 and 1480 cm$^{-1}$) and of EVA (at about 1725 and 1240 cm$^{-1}$) is evident in the insoluble residue which, therefore, is shown to be a combination of SAN and EVA presumably bound together by interreacted nitrile and ester groups.

When a 10.6 g sample of the simple blend of SAN and EVA as produced in Example 2 is exhaustively extracted with acetone and with toluene, no residue remains. Therefore, an acid compatibilizing agent as in Example 1 is necessary to combine the nitrile containing and ester containing polymers.

EXAMPLE 18

To the Plastograph mixing chamber of Example 1 are added 38 parts of SAN resin, 0.2 parts of stearic acid, 0.2 parts of 4,4'-bis-(2-methyl-6-t-butylphenol) antioxidant and 2 parts of a hydrolyzed (96.6% saponification) EVA which originally had 27.5% vinyl acetate content. The mixture is milled at 60 rpm, and after 10 minutes (179° C. internal) 0.28 part of p-toluene-sulfonic acid is added as a 1.5 M solution. The torque increases 1.07-fold in two minutes, evidence of reactive cross-linking. The product, with SAN/hydrolyzed EVA ratio 95/5, is a tan, somewhat brittle thermoplastic.

When the experiment is repeated, but using 2 parts of SAN to 38 parts of hydrolyzed EVA (ratio 5/95) and 0.43 part of ammonium bisulfate as the acid condensing agent, the torque increase is 2.7-fold over 25 minutes. The product, obviously highly cross-linked, is difficult to mold at 170° C. and gives a quite rough and boardy molding.

EXAMPLES 19–24

The variety of acid condensation agents useful in the process of this invention may be illustrated as follows. To blends of 32 parts of SAN resin and 8 parts of the 20% hydrolyzed EVA of Examples 8–10 being milled in the Plastograph at 60 rpm and 170° C. jacket temperature are added 3 Meq. of the acids indicated in the Table below. Torque and internal temperature increases are evidence of cross-linking; Gardner impact values are measures of compatibilization efficiency for the particular composition produced:

| Ex. | Acid(a) Type | pKa | 30 Minute Increase of Torque, M.G. | Temp.,°C. | Gardner Impact In.Lb./Mil |
|---|---|---|---|---|---|
| 19 | Sulfamic | 1.2(b) | 2,900 | 15 | 1.1 |
| 20 | KHSO$_4$ | 1.92 | 2,800 | 13 | 1.1 |
| 21 | d-Tartaric | 2.98 | 3,500 | 15 | 0.06 |
| 22 | Citric | 3.08 | 2,240 | 11 | 0.08 |
| 23 | Mandelic | 3.85 | 1,150 | 6 | 0.03 |
| 24 | None | — | 0 | 0 | 0.02 |

(a)pKa values from The Handbook of Chemistry and Physics, Chemical Rubber Company, 46th Edition, 1964.
(b)Estimated.

EXAMPLE 25

When Example 1 is repeated with 32 parts of polystyrene molding resin substituted for the SAN copolymer, no torque increase occurs over 30 minutes milling.

When Example 1 is again repeated, but with 8 parts of low density polyethylene substituted for the EVA copolymer, no torque increase occurs over 20 minutes of milling.

It is concluded that both a nitrile group containing component and a component containing functional groups chemically condensable with nitrile are necessary in the blend to be compatibilized by the process of this invention.

EXAMPLE 26

To illustrate that dilute acid condensation agent solutions are not necessary to the operation of the process of this invention. Example 1 is repeated substituting 0.44 part of practical grade 2-naphthalene-sulfonic acid monohydrate for the p-toluenesulfonic acid solution and no water is added. Over 30 minutes after the acid addition, a 1.7-fold torque increase at internal temperatures up to 202° C. occurs. The compatibilized product has a Gardner impact resistance of 1.6 in. lb. per mil.

EXAMPLE 27

Example 1 is repeated several times, the products being combined to furnish sufficient material for physical testing. Properties are compared with a commercial ABS (CYCOLAC-L) in the following Table:

| Physical Property | ASTM Method | Compatibilized SAN/EVA | Cycolac-L |
|---|---|---|---|
| Yield Tensile, psi | D638-64T | 3890 | 4000 |
| Elongation, % | | 1 | 4 |
| Flexural Modulus, psi × 10$^{-3}$ | D790-66 | 300 | 210 |
| Gardner Impact, in. lb./mil | — | 1.4 | 1.1 |
| Solvent Resist. As % Wt. Loss in | D543-65 | (7 days/73° F., then re-dried in vacuuo) | |
| Acetone | | −73 | −100 |
| Toluene | | −24 | 0 |

EXAMPLES 28–38

In order to demonstrate breadth of application, a number of mixtures are subjected to the compatibilization reaction according to my invention. Reactions are carried out according to the general directions of Example 1, increase in the Plastograph torque (melt viscosity measure) reading indicating positive results. Material proportions and experimental results are summarized in the following Table. Material types used are the following:

ABS-L is CYCOLAC-L and ABS-T is CYCOLAC-T. These are commercial high impact grade resins (Marbon Chemical Company).

Dihydroxy PBD is a hydroxyl terminated polybutadiene of average molecular weight 2,000 and functionality near 2.

E-VAc-$SO_2$ is a terpolymer of ethylene, vinyl acetate and sulfur dioxide in ratio 53.1:43:3.9.

molecular weight components (sorbitol [M.W. 182] in Example 30; octadecanol [M.W. 270] in Example 32; methylene glutaronitrile [M.W. 106] in Example 37) and the improvement of a commercial impact grade resin in Example 33 wherein the Gardner falling weight impact strength of CYCOLAC-L is increased from 1.1 to 1.3 in. lb. mil. Other useful features of my invention will be apparent to those versed in the art.

| Ex. | Nitrile Functional Material | Parts | Nitrile Condensable Group Material | Parts | Acid Compatibilization Agent | Parts | Plastograph Torque Increase in M.G. | Observations, Product |
|---|---|---|---|---|---|---|---|---|
| 28 | SAN + NBR-33 | 80 15 | HEVA-66-81 | 5 | Sulfamic Acid | 0.43 | 3600 | Tough thermoplastic. Gardner impact resist. > 2 in.lb./mil. |
| 29 | SAN | 80 | E-VAc-$SO_2$ Terpol. | 20 | p-Toluene Sulfonic Acid | 0.77 | 3200 | Translucent thermoplastic. Not brittle in bending. |
| 30 | SAN | 95 | Sorbitol | 5 | Potassium Bisulfate | 5.0 | 2050 | Translucent thermoplastic. |
| 31 | SAN + NBR-33 | 80 15 | Raw Cotton | 5 | Sulfamic Acid | 0.43 | 1100 | Translucent thermoplastic |
| 32 | SAN | 95 | Octadecanol | 5 | Sulfamic Acid | 2.0 | 500 | Obvious volume shrinkage after acid reaction began |
| 33 | ABS-L | 75 | HEVA-11-91 | 25 | Ammonium Bisulfate | 0.86 | 5180 | Tough thermoplastic. Gardner impact resist. 1.3 in.lb./mil. |
| 34 | NBR-33 | 96 | Dihydroxy PBD | 4 | Ammonium Busulfate | 0.69 | 2350 | Rubber product. |
| 35 | Cyanoethylated Starch | 25 | HEVA-42-52 | 75 | Ammonium Bisulfate | 0.43 | 4370 | Very tough thermoplastic rubber. Little blush on extension. |
| 36 | NBR-21 | 75 | Poly(Styrene-co Allyl Alcohol) | 25 | p-Toluene Sulfonic Acid | 1.2 | 2100 | Translucent rubber with good extension-return. |
| 37 | MGN | 2.5 | HEVA-42-52 | 97.5 | Sulfamic Acid | 0.74 | 9500 | Highly cross-linked rubber. |
| 38 | ABS-T | 96 | Paraplex G-54 Polyester | 4 | p-Toluene Sulfonic Acid | 1.5 | 1580 | Tough thermoplastic. |

HEVA-11-91 is a 91% saponified copolymer of ethylene and vinyl acetate (89:11); HEVA-42-52 is 52% saponified copolymer (58:42); HEVA-66-81 is 81% saponified copolymer (34:66).

MGN is methylene glutaronitrile.

NBR-21 is HYCAR-1494P-80 and NBR-33 is HYCAR-1452P-50, nitrile rubbers containing 21% and 33% acrylonitrile, respectively, (B. F. Goodrich Company).

PARAPLEX G-54 is a liquid polyester of adipic acid with one or more glycols, saponification number 500 and molecular weight 3,500 (Rohm and Haas Company).

Poly(styrene-coallyl alcohol) is a copolymer of styrene with allyl alcohol having molecular weight about 1,150 and 7.8% hydroxyl.

SAN is TYRIL-767 styrene-acrylonitrile copolymer (Dow Company).

Features of note in these Examples include the use of more than two components, those of a similar nature (e.g., nitrile functional) being compatibilized by reaction with those able to coreact (e.g., nitrile condensables) as in Examples 28 and 31; the utility of monofunctional (Example 32) and difunctional (Examples 34, 37 and 38) type components; the utility of relatively low Among the preferred compatibilized blends and composites of the present invention is the compatibilized mixture of a styrene-acrylonitrile copolymer with an ethylene-vinyl acetate copolymer or saponified ethylene-vinyl acetate copolymer, and also a compatibilized blend of styrene-acrylonitrile copolymer, ethylene-vinyl acetate copolymer and a minor quantity of an alcohol, esterified alcohol or nitrile having from 2 to about 100 functional groups and a molecular weight of about 100 to 10,000. As examples of the latter, particularly preferred are compatibilized blends of 60–85 parts of styrene-acrylonitrile copolymer, 15–40 parts of ethylene-vinyl acetate copolymer having 35%–55% vinyl acetate content and about 0.01 to 20 parts of an alcohol, esterified alcohol or nitrile having from 2 to about 50 functional groups and a molecular weight of about 100 to 5,000 with notched Izod impact strength exceeding about 1 ft. lb./in. of notch. Such preferred compositions are illustrated in the following Examples.

EXAMPLES 39–42

Example 1 was repeated except that 0.1 part of a low molecular weight modifier was added with the SAN and EVA components and before the acid addition. The following results show that in each case the impact resistance properties of the compatibilized product were improved:

| Example | Modifier | Impact Resistance | |
|---|---|---|---|
| | | Gardner in. lb./mil | Notched Izod ft. lb./in. |
| 1 | None | 1.4 | 0.6 |
| 39 | Triacetin | 1.5 | 8.5 |
| 40 | Paraplex G-54 | 2.0 | 10.6 |
| 41 | Monostearin | 1.5 | 2.9 |
| 42 | MGN | 2.0 | 10.4 |

EXAMPLE 43

Example 42 was repeated except that 0.4 part of methylene-glutaronitrile was used instead of 0.1 part. The product composition had a Gardner impact resistance 3.1 in. lb./mil and a Notched Izod impact resistance 8.5 ft. lb./in.

Various changes and modifications can be made in the process and products of this invention without departing from the spirit and scope thereof. The various embodiments disclosed herein were for the purpose of further illustrating the invention but were not intended to limit it.

I claim:

1. A method for providing a grossly homogeneous, permanently miscible mixture of polymers which has properties not evident in a simple blend of the polymers and which does not separate spontaneously into the component polymers, which comprises uniformly mixing (a) a polymer component containing a nitrile functionality with (b) a polymer component containing hydroxyl or esterified hydroxyl functional groups condensable with nitriles, said polymer components (a) and (b) tending to spontaneously separate from a simple blend thereof, in the presence of from about 0.001 to 8 percent by weight of the mixture of polymers and acid of an acid compatibilizing agent and for a period sufficient to provide the aforesaid permanently miscible mixture of polymers which, at ambient temperature, is in the form of a solid.

2. The method of claim 1 wherein the nitrile group containing component has a multiplicity of nitrile functionalities and limited volatility at 100°—250° C. and wherein the chemically condensable material is a polymer component containing hydroxyl or ester functional groups.

3. The method of claim 2 wherein the nitrile group containing component is a polymer or copolymer of a nitrolic monomer, said monomer containing 1 to about 2 nitrile groups and is present in an amount from about 5% to 95% of the mixture.

4. The method of claim 1 wherein said nitrile group material is selected from the group consisting of polyacrylonitrile, polymethacrylonitrile, methacrylonitrile-acrylonitrile-vinyl acetate terpolymer, styrene-acrylonitrile copolymer, acrylonitrile-acrylic ester copolymer, acrylonitrile-butadiene-styrene terpolymer, acrylonitrile-styrene-alpha methyl styrene terpolymer, nitrile rubber, polycaprolactam-acrylonitrile graft copolymer, polyethylene-acrylonitrile graft copolymer, polyethylene terephthalate-acrylonitrile graft copolymer, cyano-styrene-methylmethacrylate copolymer, acrylonitrile-methyl vinyl ether copolymer, methacrylonitrile-alpha methylstyrene copolymer, cyanoethylated cellulose, cyanoethylated polyvinyl alcohol, cyanoethylated polyamide, cyanoethylated polystyrene and cyano-ethylated silicone polymer; and wherein said chemically condensable material is selected from the group consisting of polyvinyl alcohol, polyvinyl butyral containing unreacted alcohol groups, ethylene-vinyl acetate, saponified or partly saponified ethylene-vinyl acetate copolymers, ethylene-vinyl acetate-sulfur dioxide terpolymer, vinyl chloride-vinyl acetate, nylon grafted with vinyl acetate, polytetrafluoroethylene grafted with vinyl acetate, polyvinyl alcohol grafted with butylmethacrylate, vinyl acetate-isobutyl vinyl ether copolymer, styrene-allyl alcohol copolymer polyethylene adipate, styrenated polyester of maleic and phthalic acids with ethylene and propylene glycols, polyethylene terephthalate, cellulose, hydroxyethyl methacrylate copolymer, hydroxybutyl vinyl ether copolymer, hydroxyethyl methacrylamide copolymer, polyethylene glycol, hydroxyl terminated polystyrene, hydroxyl terminated polybutadiene, and hydroxyl terminated polyisoprene.

5. The method of claim 1 wherein the acid is a strong acid having a $pK_a$ in water of less than about 1.

6. The method of claim 5 wherein said acid is selected from the group consisting of aryl sulfonic acid, alkyl ester of sulfuric acid, picric acid and mineral acids.

7. The process of claim 5 wherein said acid is an aryl sulfonic acid.

8. The method of claim 5 wherein said nitrile containing material is styrene-acrylonitrile and said chemically condensable material is ethylene-vinyl acetate.

9. The method of claim 8 wherein said acid is an aryl sulfonic acid.

10. The method of claim 9 wherein said aryl sulfonic acid is toluene sulfonic acid.

11. The method of claim 9 wherein said aryl sulfonic acid is naphthalene sulfonic acid.

12. The method of claim 1 wherein said chemically condensable material is a polymer alcohol and said acid is a weak acid having a $pK_a$ in water of less than about 4 and greater than about 1.

13. The method of claim 1 wherein said amount is about 0.1 to 5 percent by weight.

14. The method of claim 1 wherein said mixing is effected at a temperature of about 100°-300° C.

15. The method of claim 1 wherein said nitrile functional component is styrene-acrylonitrile copolymer and said nitrile condensable component is ethylene-vinyl acetate copolymer or saponified ethylene-vinyl acetate copolymer.

16. The method of claim 15 wherein an esterified alcohol having 2 to about 10 hydroxyl groups and a molecular weight of about 100–1,000 is present during the mixing process.

17. A mixture of polymers produced by the process of claim 1.

18. The mixture of claim 17 wherein said components are styrene-acrylonitrile copolymer and ethylene-vinyl acetate copolymer or saponified ethylene-vinyl acetate copolymer.

19. The mixture of claim 17 wherein said components are styrene-acrylonitrile, ethylene-vinyl acetate copolymer, and another esterified alcohol of 2 to about 10 hydroxyl groups and a molecular weight of about 100–1,000.

20. The compatibilized mixture of claim 17 wherein said normally incompatible components are styrene-acrylonitrile copolymer, ethylene-vinyl acetate copolymer, and a nitrile other than styrene-acrylonitrile copolymer having from 2 to about 100 functional groups and a molecular weight of about 100–10,000.

* * * * *